(12) United States Patent
Otting

(10) Patent No.: US 10,035,316 B2
(45) Date of Patent: Jul. 31, 2018

(54) SYSTEMS AND METHODS FOR MANUFACTURING A TREAD BAND

(71) Applicant: Bridgestone Bandag, LLC, Muscatine, IA (US)

(72) Inventor: Robert G. Otting, Illinois City, IL (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

(21) Appl. No.: 15/507,139

(22) PCT Filed: Oct. 9, 2015

(86) PCT No.: PCT/US2015/054798
§ 371 (c)(1),
(2) Date: Feb. 27, 2017

(87) PCT Pub. No.: WO2016/060939
PCT Pub. Date: Apr. 21, 2016

(65) Prior Publication Data
US 2017/0246823 A1    Aug. 31, 2017

Related U.S. Application Data

(60) Provisional application No. 62/064,569, filed on Oct. 16, 2014.

(51) Int. Cl.
*B29D 30/56* (2006.01)
*B29D 30/54* (2006.01)
(Continued)

(52) U.S. Cl.
CPC ............. *B29D 30/54* (2013.01); *B29D 30/56* (2013.01); *B29D 30/72* (2013.01); *B60C 11/02* (2013.01);
(Continued)

(58) Field of Classification Search
CPC ... B29D 30/56; B29D 2030/582; B60C 11/02; B60C 11/1353
See application file for complete search history.

(56) References Cited

U.S. PATENT DOCUMENTS 3,856,601 A * 12/1974 Schelkmann ........ B29D 30/542
156/382
3,951,719 A    4/1976 Hough
(Continued)

FOREIGN PATENT DOCUMENTS

CN    101837713 A    5/2010
CN    201670058 U    12/2010
(Continued)

OTHER PUBLICATIONS

Machine translation for China 201670058 U (no date).*
(Continued)

*Primary Examiner* — Steven D Maki

(57) ABSTRACT

A method of manufacturing a tread band includes providing a mold having one or more protrusions extending outward in a first direction away from a bottom surface of the mold. At least a first one of the protrusions includes a tip feature extending outward in the first direction. Rubber material is introduced into the mold. A first surface of the rubber material opposite the bottom surface covers the tip feature. The rubber material is compressed into the mold. The compressed rubber material covers the tip feature. The mold is released from the rubber material to form a tread band. The tread band has one or more grooves in a second surface opposite the first surface. The one or more grooves correspond to the one or more protrusions in the mold. A first groove corresponding to the first protrusion includes a vent corresponding to the tip feature in the mold.

15 Claims, 3 Drawing Sheets

(51) Int. Cl.
  *B29D 30/72* (2006.01)
  *B60C 11/13* (2006.01)
  *B60C 11/02* (2006.01)
  *B60C 11/00* (2006.01)
  *B60C 11/16* (2006.01)
  *B29D 30/52* (2006.01)
  *B60C 1/00* (2006.01)
  *B29D 30/06* (2006.01)
  *B29D 30/58* (2006.01)

(52) U.S. Cl.
  CPC .......... *B60C 11/1353* (2013.01); *B29D 30/52* (2013.01); *B29D 2030/0612* (2013.01); *B29D 2030/541* (2013.01); *B29D 2030/582* (2013.01); *B60C 1/0016* (2013.01); *B60C 11/00* (2013.01); *B60C 11/1693* (2013.01); *B60C 2011/1361* (2013.01)

(56) References Cited

U.S. PATENT DOCUMENTS

| | | | |
|---|---|---|---|
| 4,090,901 A | 5/1978 | Baatz | |
| 4,092,203 A | 5/1978 | Harrelson, Jr. | |
| 4,116,256 A * | 9/1978 | Morris | B24B 5/366 157/13 |
| 4,123,306 A | 10/1978 | Landry | |
| 4,664,166 A | 5/1987 | Benisti | |
| 4,708,609 A | 11/1987 | Yoda et al. | |
| 5,275,218 A | 1/1994 | Nakayama et al. | |
| 5,368,799 A | 11/1994 | Galli et al. | |
| 5,603,366 A * | 2/1997 | Nakayama | B29D 30/542 152/209.15 |
| 6,517,333 B1 * | 2/2003 | Mas | B29C 33/0038 425/28.1 |
| 7,252,488 B2 | 8/2007 | Nakai | |
| 8,636,044 B2 | 1/2014 | Colby | |
| 2007/0278707 A1 | 12/2007 | Koberlein | |
| 2009/0199944 A1 | 8/2009 | Goto et al. | |
| 2013/0139938 A1 * | 6/2013 | Kouno | B60C 5/01 152/209.18 |
| 2013/0240102 A1 * | 9/2013 | Lopez | B29C 33/42 152/209.18 |

FOREIGN PATENT DOCUMENTS

| | | | |
|---|---|---|---|
| CN | 201670058 U * | 12/2010 | |
| DE | 2647514 A1 * | 4/1978 | |
| DE | 3420454 A1 * | 2/1986 | |
| GB | 746375 A * | 3/1956 | |
| GB | 746375 A | 3/1956 | |
| JP | 3096407 | 4/1991 | |
| JP | 05-116235 A * | 5/1993 | |
| JP | 5155202 A | 6/1993 | |
| JP | 2000-255221 A | 9/2000 | |
| JP | 2000-343916 A | 12/2000 | |
| JP | 2001039127 A | 2/2001 | |
| JP | 2001-191736 A * | 7/2001 | |
| JP | 2007320044 A | 12/2007 | |
| JP | 2012-020512 A * | 2/2012 | |
| KR | 10-1384920 B1 | 4/2014 | |
| WO | WO2013-095406 A1 | 6/2013 | |
| WO | WO2014070173 | 5/2014 | |
| WO | WO-2014/178849 A1 * | 11/2014 | |

OTHER PUBLICATIONS

Machine translation for Japan 2012-020512 (no date).*
Machine translation for Japan 2001-191736 (no date).*
Machine translation for Japan 05-116235 (no date).*
Machine translation for Germany 3,420,454 (no date).*
Translation for Germany 2,647,514 (no date).*
Tire Retread & Repair Information Bureau, "Mold Cure vs. Pre Cure", from http://www.retread.org/#!mold-cure-vs-pre-cure/cnlp, taken on May 29, 2014.
Min, In Gyou; International Search Report and Written Opinion for PCT/US2015/054798; dated Dec. 22, 2015; pp. 1-11; Korean Intellectual Property Office; Daejeon Metropolitan City; Republic of Korea.
China National Tire and Rubber Guiling Co, English abstract of CN101837713A, dated on May 21, 2010.
China Chemical Industry Rubber Guilin Co, CN201670058U, English abstract of CN201670058U, dated on Dec. 15, 2010.
Bridgestone Corp, English abstract of JP3096407, dated on Apr. 22, 1991.
Yokohama Rubber Co., Ltd., English abstract of JP2000255221A, dated on Sep. 19, 2000.
Toyo Tire & Rubber Co., Ltd., English abstract of JP2000343916A, dated on Dec. 12, 2000.
Bridgestone Corp, English abstract of JP2001039127A, dated on Feb. 13, 2001.
Bridgestone Corp, English abstract of JP2007320044A, dated on Dec. 13, 2007.
Bridgestone Corp, English abstract of JPH05155202A, dated on Jun. 22, 1993.
Hankook Tire Co., Ltd., English abstract of KR101384920B, dated on Apr. 11, 2014.

* cited by examiner

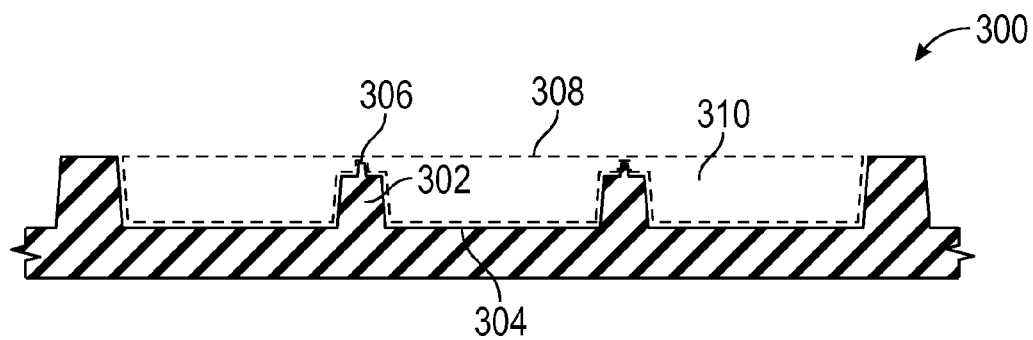
FIG. 3A
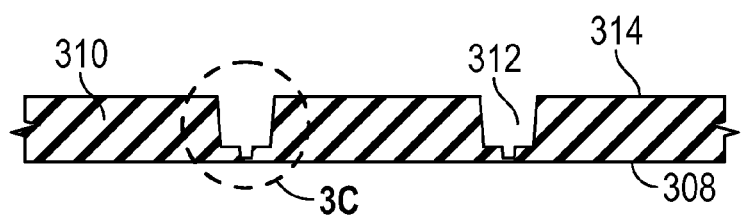
FIG. 3B
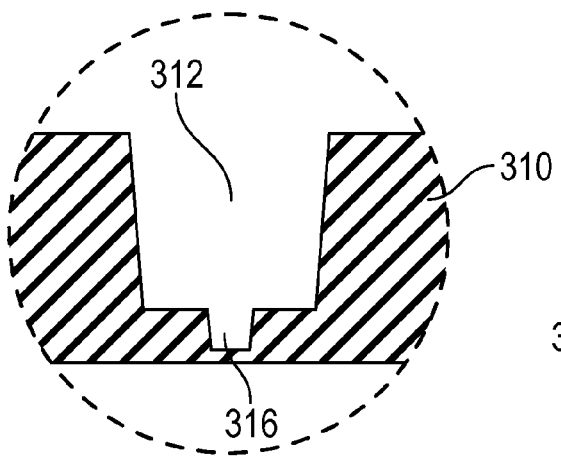 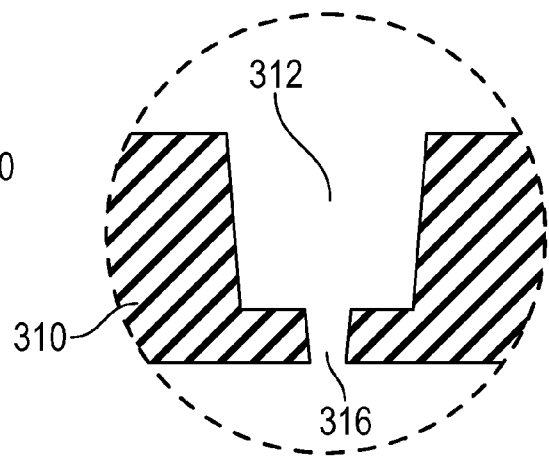
FIG. 3C             FIG. 3D

SYSTEMS AND METHODS FOR MANUFACTURING A TREAD BAND

BACKGROUND

The present disclosure relates generally to tire retreading, and more particularly to systems and methods for manufacturing a tire tread and retreaded tires using the same.

When a tire becomes worn, worn tread can be replaced using a process known as retreading. Such retreading can include a mechanical buffing process to remove worn tire tread from the tire casing. The buffing process allows for the tire casing to be buffed to a desired size, shape and texture. A tire tread can then be applied to the buffed casing. For example, a procured tire tread having a desired tread design on an outer surface can be applied or positioned on the buffed casing. An adhesive layer such as an uncured rubber compound may be applied between the tread and the casing to facilitate adhesion between the tread and the casing. The assembly, including the casing and the tread, may then be cured or vulcanized in a curing chamber such as an autoclave. A retreaded tire may thereby be manufactured.

Retreading processes have involved bonding a tread to a tire casing that is buffed flat or with a continuously arched profile. The tread includes a front face that contacts the ground and provides traction, and a back face that may be bonded to the tire casing. Grooves may be provided in the front face of the tread as part of the tread design.

During the retread process, air can become trapped between the back face of the tread band and the tire casing. In some cases, trapped air can impact performance of a tire. Therefore, it is desirable to remove trapped air or facilitate the release of air between the tread band-casing interface during the curing process. Current processes to decrease incidents of trapped air are labor and material intensive. For example, traditional methods involve drilling holes in the tread band and/or the use of "wicking" materials such as cotton cord to allow air to evacuate during the curing process. These methods add extra cost to the retread process, whether in terms of added labor or extra material. It is therefore desirable to provide improved methods and systems for minimizing trapped air in the retread process.

BRIEF SUMMARY

The present disclosure relates generally to tire retreading, and more particularly to systems and methods for manufacturing a tire tread and retreaded tires using the same. An example method includes providing a mold having one or more protrusions extending outward in a first direction away from a bottom surface of the mold. At least a first one of the protrusions includes a tip feature extending outward in the first direction. Rubber material is introduced into the mold. A first surface of the rubber material opposite the bottom surface of the mold covers the tip feature. The rubber material is compressed into the mold. The compressed rubber material covers the tip feature. The mold is released from the rubber material to form a tread band. The tread band has one or more grooves in a second surface opposite the first surface. The one or more grooves correspond to the one or more protrusions in the mold. A first groove corresponding to the first protrusion includes a vent corresponding to the tip feature in the mold.

Another example method includes providing a tire casing having a casing profile. A tire tread having a substantially smooth profile on a back side and at least one tread groove on a front side is provided. The at least one tread groove has a tread groove depth and a vent extending into a bottom of the groove. The back side of the tire tread is buffed to expose the vent to the back side of the tire tread. The buffed tire tread is positioned on the tire casing to produce a tire assembly. The substantially smooth profile on the back side of the tire tread faces the tire casing. The tire assembly is cured under pressure to form a retreaded tire. The exposed vent allows air between the tire casing and the tire tread to escape through the vent and the at least one tread groove during the curing.

An example retreaded tire includes a tire casing including sidewalls. A tire tread is cured to the tire casing. The tire tread has at least one tread groove on a front side. The at least one tread groove has a vent extending into a bottom of the groove. The tire tread was joined to the tire casing by curing a tire assembly under pressure. The tire assembly included at least a tire casing component and a tire tread component. The tire tread component has a substantially smooth profile on a back side and at least one tread groove on a front side. The at least one tread groove has a vent extending into a bottom of the groove and exposed to the back side. The back side of the tire tread component faced the tire casing component. The exposed vent permits air between the tire casing and the tire tread to escape through the vent and the at least one tread groove during the curing.

Reference to the remaining portions of the specification, including the drawings and claims, will realize other features and advantages of the present disclosure. Further features and advantages of the present disclosure, as well as the structure and operation of various embodiments of the present disclosure, are described in detail below with respect to the accompanying drawings. In the drawings, like reference numbers indicate identical or functionally similar elements.

BRIEF DESCRIPTION OF THE DRAWING(S)

FIGS. 3A-3D illustrate a process of manufacturing a tread band, according to an embodiment.

DETAILED DESCRIPTION

Retreaded tires and methods for forming the same are described. According to certain example embodiments, a tire is retreaded with a tread band having a substantially smooth back face and one or more tread grooves with a compliant skid base gauge on a front face. One or more of the grooves in the tread band include a vent hole exposed to the back face, which facilitates releasing air between the tread band-casing interface during the curing process.

Figure 1:
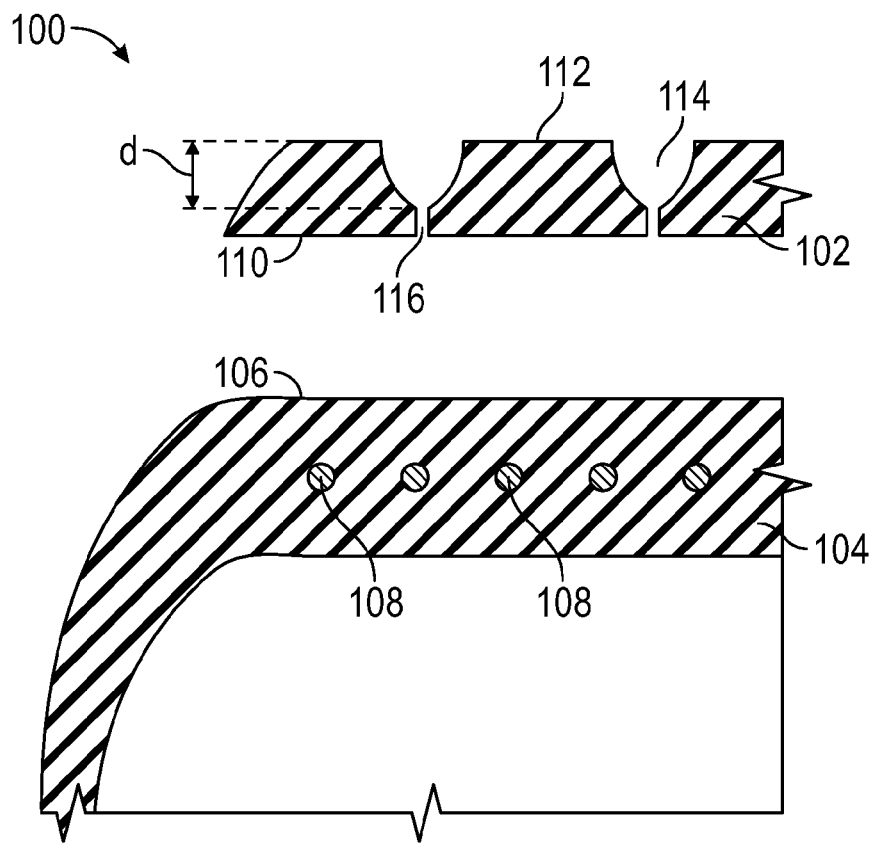
FIG. 1 is a partial cross-sectional view of separated components of a tire assembly, according to an embodiment.

FIG. 1 illustrates a partial cross-sectional view of separated components of a tire assembly 100 according to an embodiment. Tire assembly 100 includes a tread 102 and a casing 104. The tread 102 may also be referred to as a "tread band." The casing 104 includes a buffed front face 106. In certain aspects, front face 106 may have one or more pre-formed grooves (not shown), which may include pre-existing grooves in the casing, or grooves created during a buffing process. The casing 104 also typically includes a wire band including one or more wires or belts 108 embedded in the casing. The tread 102 has a substantially smooth back face 110 and an opposite front face 112. The tread 102 defines one or more tread grooves 114 extending into the tread 102 from the front face 112. It should be understood that the terms "face" and "side" are used interchangeably herein when discussing tire components such as a tire tread. Each tread groove 114 has a tread profile including a tread groove depth, d. The tread grooves 114 are depicted in FIG. 1 with a curved profile, although other profiles are possible as would be understood, such as rectangular, triangular, polygonal, etc.

Where more than one tread groove 114 is present, each groove may have the same profile (cross-sectional shape and initial tread groove depth), or some or all tread grooves 114 may have different profiles. In certain aspects, the one or more tread grooves 114 are circumferential grooves, e.g., running parallel to a centerline of the tire. The one or more tread grooves 114 may include lateral tread grooves 114, e.g., grooves having a directional component at an angle between about 1° and 90° (fully perpendicular to the centerline) with respect to the centerline of the tire. It should be appreciated that the profile of a particular tread groove 114 may change along a length of the groove 114.

As shown in FIG. 1, each groove 114 includes a vent 116 extending into a bottom of the groove 114. It should be appreciated that the tread 102 may include only one groove with a vent 116, or some or all grooves 114 in the tread 102 may have a vent 116. The vent(s) 116 advantageously allow for air that may be caught or trapped between the back face 110 of the tread 102 and the front face 106 of the casing 104 to escape or evacuate during a curing process. The vent 116 may have a cylindrical shape, a conical shape, or a trench shape, for example.

Figure 2:
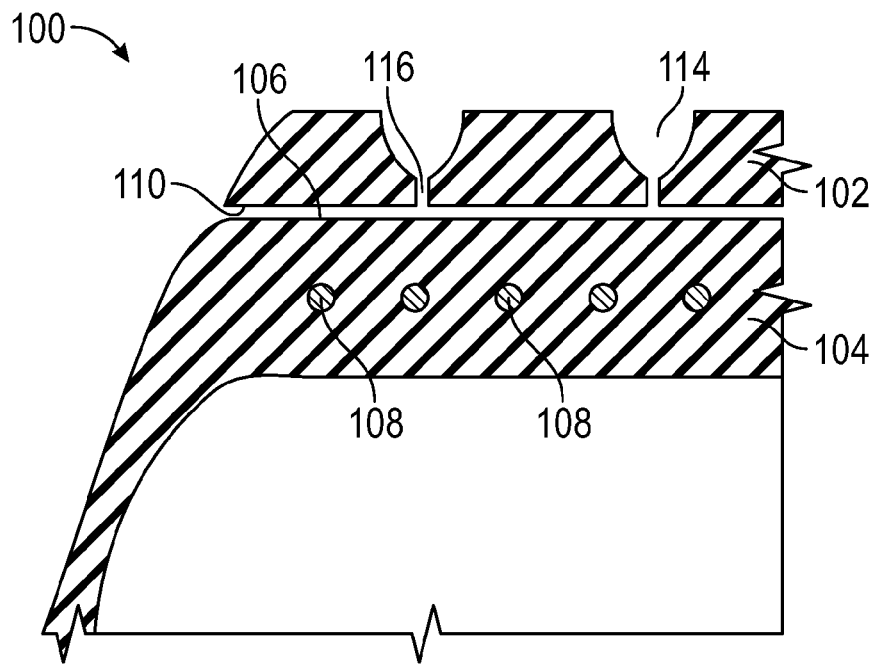
FIG. 2 is a partial cross-sectional view of a tire assembly prior to curing, according to an embodiment.

FIG. 2 is a partial cross-sectional view of tire assembly 100 prior to curing according to an embodiment. As shown, the tread 102 is positioned on the casing 104 such that the substantially smooth back face 110 of tread 102 faces the buffed front face 106 of the casing 104 with the one or more vent 116 exposing the tread band-casing interface to allow for air to evacuate via the vent 116 and the tread groove 114 during curing.

A bonding layer (not shown) may be provided between the tread 102 and the casing 104. The bonding layer may include a rubber compound or cement layer that facilitates bonding of the tread 102 to the casing 104 as is well known. Examples of useful materials for the bonding layer include uncured rubber compounds and mixtures thereof. When a bonding layer is used, the vent hole(s) expose the tread band-bonding layer interface (hereinafter discussed as the tread band casing interface). As shown in FIG. 2, when the tread 102 is positioned and aligned on the casing 104, one or more gaps or spaces corresponding to the one or more vents 116 are present between the back face 110 and tread 102.

The back face 110 may include some amount of roughness or granularity as determined by the rubber composition used and the extruding process used to create the tread 102, and any pre-assembly processing and the like. In general, the entire back face 110 may be flat when positioned on a flat surface, however, due to the flexibility of rubber materials typically used, the substantially smooth back face 110 will bend to accommodate a curved surface, e.g., a curved casing profile. The back face 110 generally has a smooth and continuous surface contour over the entire profile of the back face 110, but for the vents 116. It should be appreciated that the back face 110, which may be substantially smooth, may also include protrusions or grooves formed in the back face 110. For example, the back face 110 may define an alignment feature or protrusion, extending outward or inward from the back face 110 and which may be positioned to facilitate attachment or alignment of the tread 102 on the casing 104 by mating with a complementary groove or feature on the casing 104.

The tire assembly 100 shown in FIG. 2 is subjected to a curing process. During the curing process, the back face 110 of the tread 102 conforms to the profile of the front face 106 of the casing 104. Due to the increased pressure during curing, air between the back face 110 of the tread 102 and the front face 106 of the casing 104 is released or evacuated through the vent 116 and through the tread groove 114.

FIGS. 3A-3D illustrate a process of manufacturing a tread band according to an embodiment. More particularly, FIG. 3A is a partial cross-sectional view of a mold 300. The mold 300 includes one or more protrusions 302, e.g., groove forming protrusions. The protrusion(s) 302 extend outward in a first direction away from a bottom surface 304 of the mold. At least one of the protrusions 302 includes a tip feature 306, which extends outward in the first direction. The tip feature 306 is structured to form a vent in a tire tread formed by the mold 300. In certain embodiments, the one or more protrusions 302 of the mold 300 are spaced between 6" and 12" from each other, and the tip feature 306 has a dimension of between $\frac{1}{16}$" to $\frac{1}{4}$" in a direction perpendicular to the first direction. In certain embodiments, the tip feature 306 is substantially cylindrical-shaped or substantially cone-shaped, and each of the one or more protrusions 302 has a substantially cylindrical-shaped or substantially cone-shaped cross-sectional profile. In certain embodiments, each of the one or more protrusions 302 has a dimension of $\frac{1}{8}$" or greater in a direction perpendicular to the first direction. Thus, in one embodiment, the vent has a width of at least $\frac{1}{8}$".

A rubber material typical for forming tire treads is introduced into the mold 300, wherein a first surface 308 (e.g., an exposed or outer surface), of the rubber material opposite the bottom surface 304 of the mold covers the tip feature(s) 306. The rubber material can be compressed into the mold as necessary, e.g., using a hydraulic press or similar mechanism for compressing or pressing the rubber material into the mold. The dotted line in FIG. 3A shows the rubber material after having been compressed. In one embodiment, the compressed rubber material covers the tip feature(s) 306 as shown in FIG. 3A. The rubber material is removed or released from the mold to form a tread band 310 having one or more grooves 312 in a second surface 314 opposite the first surface 308, as shown in FIG. 3B. The one or more grooves 312 correspond to the one or more protrusions 302 in the mold 300. One or more of the grooves 312 include a venting region 316 corresponding to the tip feature 306 in the mold. As can be seen in FIG. 3A, the tread band 310 includes a backside without an exposed venting region. In one embodiment, as shown in FIG. 3D, the tread band 310 is buffed on the first surface 308 to expose the one or more venting regions formed in the grooves 312. It should be appreciated that the buffing can be performed immediately after formation of the tread band, immediately before formation of a tire assembly for curing, or anytime therebetween.

Figure 4:
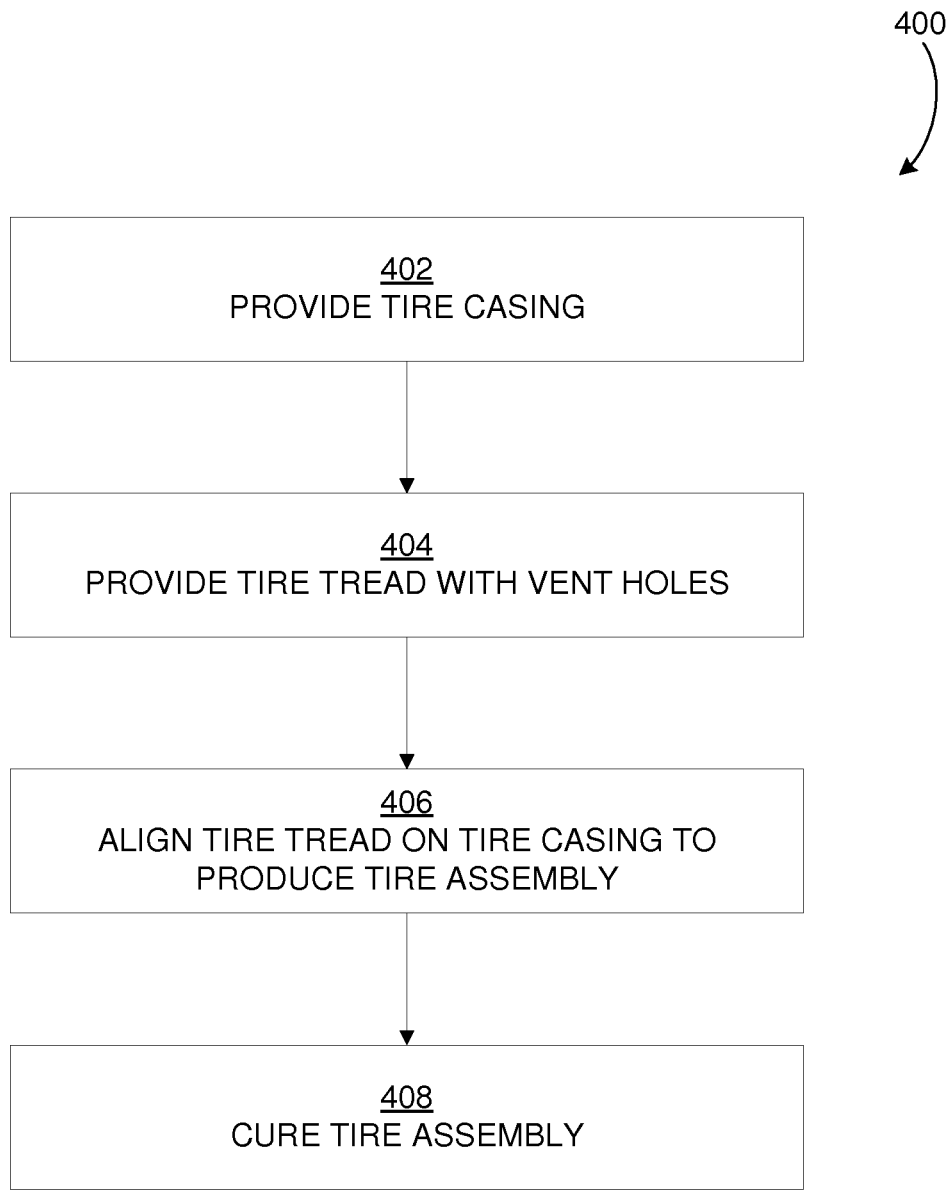
FIG. 4 is a flow diagram illustrating a method of retreading a tire, according to an embodiment.

FIG. 4 is a flow diagram of a method 400 of retreading a tire, according to an embodiment. In step 402, a tire casing is provided. The tire casing may be provided pre-buffed with a desired shape or contour, or it may be buffed to remove any worn tread, and shaped as desired. In step 404, a tire tread such as the tread band 310 is provided, which has a substantially smooth profile on a back side and a tread groove pattern having at least one tread groove on a front side, the at least one tread groove having a tread groove depth and a venting region or hole extending into a bottom of the groove. Again, it should be appreciated that the provided tire tread could have unexposed venting region(s) or hole(s) (see, e.g., FIG. 3C), in which case an optional step of buffing the backside of the tire tread to expose the venting region(s) or hole(s) is performed.

In step 406, the tire tread is placed or positioned on the tire casing such that the substantially smooth profile on the back side of the tire tread faces the tire casing and the at least one venting region or hole providing an evacuation region for air. The alignment step 406 produces a tire assembly. A step of applying or placing a bonding material between the tire casing and the tire tread may be performed prior to curing, e.g., prior to alignment step 406. The bonding material facilitates attachment or bonding of the tire tread to the casing during the curing process. In step 408, the tire assembly is cured. For example, the tire assembly is cured under pressure in a chamber or vessel such as an autoclave. The chamber or vessel may have a pressure source operable to adjust the pressure within the vessel and a heat source operable to adjust the temperature within the vessel. Curing typically includes increasing the pressure and the temperature within the curing chamber or vessel. In association with the curing process, the back side of the tire tread conforms to the casing profile and air between the tread band and casing is evacuated through the venting region.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All method or process steps described herein can be performed in any suitable order unless otherwise indicated herein or otherwise clearly contradicted by context. The use of any and all examples, or exemplary language (e.g., "such as") provided herein, is intended merely to better illuminate the various embodiments and does not pose a limitation on the scope of the various embodiments unless otherwise claimed. No language in the specification should be construed as indicating any non-claimed element as essential to the practice of the various embodiments.

Exemplary embodiments are described herein, including the best mode known to the inventors. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, all modifications and equivalents of the subject matter recited in the claims appended hereto are included as permitted by applicable law. Moreover, any combination of the above-described elements in all possible variations thereof is encompassed unless otherwise indicated herein or otherwise clearly contradicted by context.

The invention claimed is:

1. A method of manufacturing, comprising:
providing a mold having one or more protrusions extending outward in a first direction away from a bottom surface of the mold, at least a first one of the protrusions including a tip feature extending outward in the first direction;
introducing a rubber material into the mold, wherein a first surface of the rubber material opposite the bottom surface of the mold covers the tip feature;
compressing the rubber material into the mold, wherein the compressed rubber material covers the tip feature;
releasing the mold from the rubber material to form a tread band, the tread band having one or more grooves in a second surface opposite the first surface, the first surface comprising a back surface of the tread band to face a tire casing during a retreading process, the one or more grooves corresponding to the one or more protrusions in the mold, wherein a first groove corresponding to the first protrusion includes a vent corresponding to the tip feature in the mold, wherein the first surface covers the vent so that the vent is unexposed prior to buffing the first surface;
buffing the first surface of the tread band so that the vent is exposed;
positioning the buffed tread band on the tire casing to produce a tire assembly; and
curing the tire assembly under pressure to form a retreaded tire, wherein the exposed vent allows air between the tire casing and the tire tread to escape through the vent and the one or more grooves during the curing.

2. The method recited in claim 1, wherein compressing includes pressing the rubber material downward toward the bottom surface of the mold.

3. The method recited in claim 2, wherein the pressing is performed using a hydraulic press.

4. The method recited in claim 1, wherein at least one of the one or more grooves of the tread band includes a circumferential groove.

5. The method recited in claim 4, wherein at least one of the one or more grooves includes a lateral groove.

6. The method recited in claim 1, wherein the mold includes a plurality of protrusions spaced between 6" and 12" from each other.

7. The method recited in claim 1, wherein the tip feature has a dimension of between $1/16"$ to $1/4"$ in a direction perpendicular to the first direction.

8. The method recited in claim 1, wherein the tip feature is substantially cylindrical-shaped or substantially cone-shaped.

9. The method recited in claim 1, wherein the one or more protrusions each has a substantially cylindrical-shaped or substantially cone-shaped cross-sectional profile.

10. The method recited in claim 1, wherein the one or more protrusions each has a dimension of $1/8"$ or greater in a direction perpendicular to the first direction.

11. A method of retreading a tire, the method comprising:
providing a tire casing having a casing profile;

providing a tire tread having a substantially smooth profile on a back side and at least one tread groove on a front side, the at least one tread groove having a tread groove depth and a vent extending into a bottom of the groove wherein the back side covers the vent so that the vent is unexposed prior to buffing the back side;

buffing the back side of the tire tread to expose the vent to the back side of the tire tread;

positioning the buffed tire tread on the tire casing to produce a tire assembly, wherein the substantially smooth profile on the back side of the tire tread faces the tire casing; and curing the tire assembly under pressure to form a retreaded tire, wherein the exposed vent allows air between the tire casing and the tire tread to escape through the vent and the at least one tread groove during the curing.

12. The method recited in claim 11, further comprising placing a bonding material between the tire casing and the tire tread prior to curing.

13. The method recited in claim 11, wherein at least one of the at least one tread groove of the tread band includes a circumferential groove.

14. The method recited in claim 13, wherein at least one of the at least one tread groove includes a lateral groove.

15. The method recited in claim 11, wherein the vent has a width of at least ⅛".

\* \* \* \* \*